June 23, 1931.   H. C. NAGEL   1,811,474
LOCKING DEVICE
Filed Oct. 8, 1927

INVENTOR
Harry C. Nagel
BY
ATTORNEY

Patented June 23, 1931

1,811,474

UNITED STATES PATENT OFFICE

HARRY C. NAGEL, OF WILKINSBURG, PENNSYLVANIA, ASSIGNOR TO WESTINGHOUSE ELECTRIC & MANUFACTURING COMPANY, A CORPORATION OF PENNSYLVANIA

LOCKING DEVICE

Application filed October 8, 1927. Serial No. 224,878.

My invention relates, in general, to locking devices and more particularly to means for locking resistor elements in position upon their supporting frames.

One object of the invention is the provision of locking attachments for resistance devices that shall be simple and efficient in operation and capable of being readily end economically manufactured.

Another object of the invention is to provide a resistance device in which the resistor elements may be easily and quickly mounted upon, or removed from, their supporting frames independently of each other.

It is also an object of the invention to provide a structure having joints which may be quickly assembled and locked together and which may be quickly unlocked and disassembled.

Other objects of the invention will, in part, be obvious and will, in part appear hereinafter.

The invention, as disclosed in the accompanying drawings, comprises the structural features and the combination of elements and arrangement of parts which will be hereinafter set forth and particularly defined in the claims.

Figure 1:
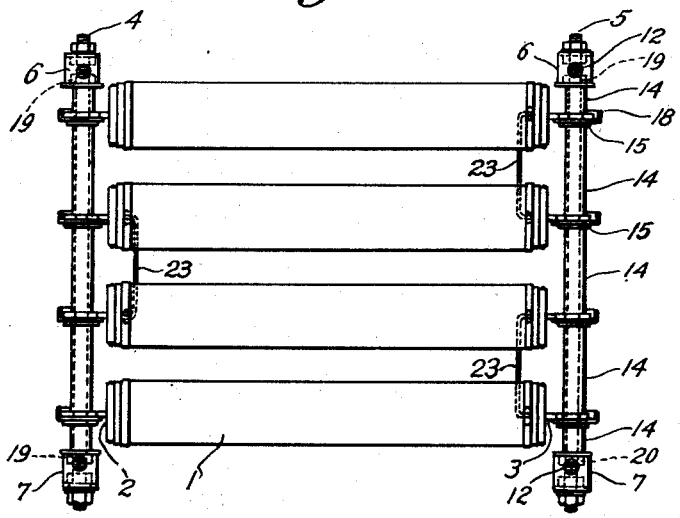
Figure 2:
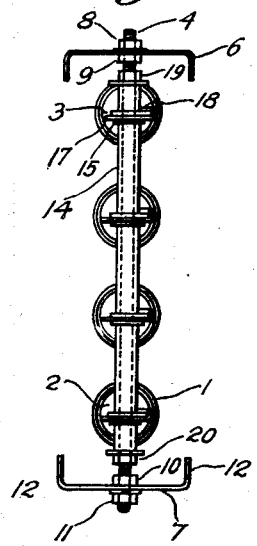
Figure 3:
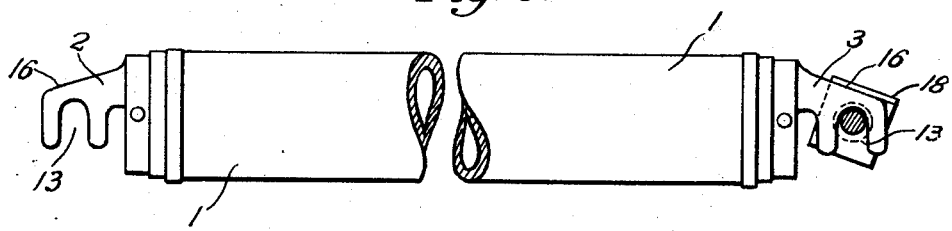
Figure 4:
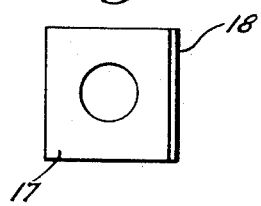
Figure 6:
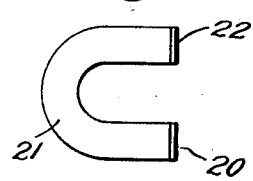
Figure 5:
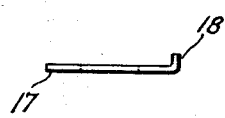
Figure 7:
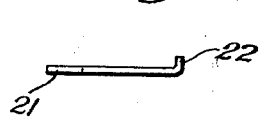

For a fuller understanding of the invention, reference may be had to the following detailed description, taken in connection with the accompanying drawings in which, Figure 1 is a view, in front elevation, of a resistance device constructed in accordance with my invention, Fig. 2 is a view, in end elevation, of the device illustrative in Fig. 2, Fig. 3 is an enlarged top plan view, of one of the resistor elements and one of the lock washers utilized for retaining it in position, Fig. 4 is a top plan view, of the lock washer shown in connection with the resistor element illustrated in Fig. 3, Fig. 5 is a view, in end elevation, of the lock washer illustrated in Fig. 4, Fig. 6 is a top plan view of a modified form of locking device, and, Fig. 7 is a view, in end elevation, of the locking device shown in Fig. 6.

In the drawings, I have illustrated a resistance device comprising a plurality of resistor elements 1 that are provided with supporting ears 2 and 3 by means of which they may be mounted upon any suitable support, such, for example, as the threaded rods 4 and 5.

In order that the resistance device may be secured to other structures for use in connection with other apparatus, each rod is provided with a pair of clips or brackets 6 and 7 which are secured thereto by means of pairs of nuts 8, 9, and 10, 11. Suitable bolt holes 12 are provided in the clips 6 and 7 in such position as to permit their ready attachment to the structures with which they are to be associated.

It will be noted that each of the ears 2 and 3 provided on the ends of the resistor elements has an open slot 13 cut in one side which extends at right angles to the axis of the resistor element 1. The open slots are disposed to face in the same direction and are made sufficiently large to embrace the supporting rods 4 and 5 when moved into contact therewith.

Inasmuch as the slots 13 are located in the sides of the supporting ears at right angles to the axis of the resistor element, the resistor element may be moved into and out of engagement with the supporting rods 4 and 5 from one side thereof.

The resistance device is shown as embodying a plurality of the resistor elements 1 which are separated from each other on the supporting rods by means of a plurality of spacers 14. Spacers of different types may be provided for retaining the resistors in position on the supporting rods. The longer spacers are preferably made from piping which may be cut to any desired length and threaded upon the supporting rods. The other spacers 15 are constructed to simulate thin washers, and a plurality of such washers may be used in connection with the longer pipe-like spacers in order to position the resistor elements upon the rods exactly as desired. The spacing washers 15 are preferably made larger in diameter than the pipe spacers 14 for the purpose of providing a better seat for the supporting ears 2 and 3.

Heretofore, resistor elements of the above-described type and provided with supporting ears have been mounted on frames comprising a plurality of rods and have been held thereon by means of nuts which were screwed down upon the supporting ears until the frictional engagement of the ears and the nuts was sufficiently strong to keep the resistor elements in place upon the supporting rods. In this construction, the resistor ears 2 and 3 are provided with flattened edges 16 opposite their open side-slots 13 in order that flanged members or lock washers 17 may be mounted upon the supporting rods in such position that their flanged portions 18 extend over and engage the flattened edges 16 of the supporting ears 2 and 3 and hold the supporting ears in position on the supporting rods, as long as the supporting ears and the flanged members or lock washers are held in close proximity to each other.

In order that the supporting ears 2 and 3 and the lock washers or flanged members 17 may be held in close proximity to each other, a plurality of nuts 19 and 20 are disposed upon the screw-threaded supporting rods 4 and 5 in such position that they may be tightened against the spacers, ears and lock washers.

As shown, one of the nuts 19 is disposed underneath the lowermost spacer on each rod but a short distance above the clip nut 10 which is employed to fasten the supporting bracket on the supporting rod. The upper spacer nut 19 mounted upon each rod is located above the spacers but some distance below the clip nuts 8 and 9 which hold the upper supporting bracket and the screw-threaded rod together. The nuts are disposed in separated positions in order that the spacer nuts 19 and 20 may be loosened from the spacers when it is desired to remove one or more of the resistor elements from the supporting rods.

When the spacer nuts are loosened, the pipe spacers, spacing washers and lock washers may be moved along the supporting rods a sufficient distance to allow the supporting ears 2 and 3 to be separated from the lock washers 17 and permit the resistor elements 1 to be removed from the supporting rods 4 and 5.

While I have illustrated the locking device as a washer provided with a flange 18 adapted to extend over the flattened edge 16 of the supporting ear when the latter is placed upon the supporting rod in side-by-side relation with the locking washers, it will be understood that the locking member may be a U-shaped device 21 provided with hooked ends 22, as illustrated in Figs. 6 and 7, or it may have any other form in which one end may be secured to the supporting rod in such manner that the other end will extend over the flattened edge of the supporting ear.

While I have shown the resistor elements 1 as being electrically connected in series by means of connectors 23, they may, of course, be electrically connected in any desired combination.

In assembling the resistance device, a spacer nut 20 is first mounted upon the lower part of each of the screw-threaded supporting rods. A sufficient number of spacers and locking devices are then threaded upon the rods, with the locking members disposed at such points between the spacers along the rods as will provide suitable locations for the resistor elements. A spacer nut 19 is then screwed upon the upper part of each supporting rod to a position where it may be employed to tighten or compress the spacers 14 and 15 and the locking members 17.

After the spacers and nuts are placed upon the rods, the resistor elements 1 are mounted upon the rods by separating the spacers and the locking members and then pushing the resistor element in sidewise toward the supporting rods until the supporting ears 2 and 3 are moved into engagement with the rods 4 and 5 at points between the spacers and the locking members. It will be noted that the ears should be disposed against the sides of the locking members toward which the flanged portions of the locking members are turned, in order that the flanged portions may rest against the flattened edges of the ears. When the resistor elements are placed in position, one or both of the spacer nuts on each supporting rod are tightened so that the spacers, supporting ears, and locking members are held in such close relation to each other so that the flanged portions of the lock washers will extend over, and be held against, the flattened edges of the supporting ears and thereby lock the resistor elements in position on the supporting rods.

The clips or brackets 6 and 7, by means of which the resistor device may be mounted upon the structure to which it is to be attached, are then fastened to the upper and lower ends of the supporting rods 4 and 5 by means of the clip nuts 8, 9, 10 and 11. The clips and clip nuts should be disposed on the supporting rod at a sufficient distance from the spacer nuts and spacers to permit the latter to be loosened and separated freely.

If it is desired to replace any one of the resistor elements 1 because of its being damaged, or for any other reason, the spacer nuts 19 on the supporting rods may be loosened, and the spacers and locking members may be separated sufficiently to permit the resistor element to be removed sidewise without disturbing the other resistor elements. Upon the removal of the resistor element, a new element may be substituted therefor without any difficulty, and the spacer nuts 19 may be again tightened to hold the resistor elements and the supporting rods firmly locked together.

While I have illustrated and described only one specific embodiment of my invention, I realize that it is susceptible of wide application, and I do not desire to be limited to the precise construction illustrated and described.

I claim as my invention:

1. In a resistance device, the combination with a frame comprising a plurality of screw-threaded rods, of a resistor element provided with a plurality of ears having open slots in one side whereby the resistor element may be mounted upon the screw-threaded rods from a side position, a plurality of flanged members disposed upon the rods with their flanged portions extending over one side of said ears, and means for holding said ears and said flanged members in locking relation to each other.

2. In a resistance device, the combination with a frame comprising a plurality of rods, of a resistor element provided with a plurality of ears having open slots in one side whereby it may be mounted upon the rods from a side position, and having flattened portions opposite said slots, a plurality of flanged members disposed on the rods adjacent the ears with their flanged portions extending over the flattened portions of said ears, and means for holding the ears and flanged members in locking relation to each other.

3. In a resistance device, the combination with a frame comprising a plurality of supporting rods, of a plurality of relatively movable spacers and flanged members disposed on the rods, a plurality of resistor elements, a plurality of ears secured to the resistor elements for mounting them upon the rods, each of said ears having an open slot in one side and a flattened portion on the opposite side whereby the resistor elements may be independently mounted upon the rods from one side thereof with the ears disposed between the spacers and the flanged members in such position that the flanged members extend over the flattened portions of the ears and lock them on the rods, and a plurality of movable nuts mounted on the rods for holding the ears and flanged members in locking relation.

4. In a resistance device, the combination with a frame comprising a plurality of supporting brackets and a plurality of supporting rods carried by the brackets, of a plurality of spacers and flanged members disposed on the rods, a plurality of resistor elements, a plurality of ears secured to the resistor elements for mounting them upon the rods, each of said ears having an open slot in one side and a flattened portion on the opposite side whereby the resistor elements may be independently mounted upon the rods from one side thereof with the ears disposed between the spacers and the flanged members in such position that the flanged members extend over the flattened portions of the ears and lock them on the rods, and a plurality of movable nuts mounted on the rods for holding the ears and flanged members in locking relation.

5. In a locking device for retaining the members of a resistor structure in engagement, in combination, a supporting rod, a plurality of resistor members provided with slotted ear portions for engaging the supporting rod, a plurality of spacing members carried by said rod, disposed to retain the supported members in spaced relation, a locking-member movably mounted on the supporting rod between each pair of spacing members, said locking members being adapted to receive the ear members as they are moved relative to one another and longitudinally of the supporting member, and members in threaded engagement with the supporting member for moving the spacing members longitudinally of the said supporting member, thereby to effect the engagement of the locking members and ear portions.

In testimony whereof, I have hereunto subscribed my name this 5th day of October, 1927.

HARRY C. NAGEL.